United States Patent
Liu et al.

(10) Patent No.: US 8,849,331 B2
(45) Date of Patent: Sep. 30, 2014

(54) POWER SAVING IN A TELECOMMUNICATIONS NETWORK

(75) Inventors: Chunming Liu, Bellevue, WA (US); Christopher Lawrence, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 224 days.

(21) Appl. No.: 13/587,749

(22) Filed: Aug. 16, 2012

(65) Prior Publication Data

US 2013/0217428 A1 Aug. 22, 2013

Related U.S. Application Data

(60) Provisional application No. 61/525,098, filed on Aug. 18, 2011.

(51) Int. Cl.
*H04B 7/00* (2006.01)
*H04W 52/02* (2009.01)
*H04W 72/12* (2009.01)

(52) U.S. Cl.
CPC .............. *H04W 52/02* (2013.01); *Y02B 60/50* (2013.01); *H04W 52/0235* (2013.01); *H04W 72/1247* (2013.01)
USPC ..................... 455/509; 455/343.2; 455/343.4; 455/127.1; 370/311

(58) Field of Classification Search
CPC .......... H04W 52/0216; H04W 72/005; H04W 72/0413; H04W 72/0406; H04W 52/02; H04W 52/0219; H04W 52/0261; H04W 72/1278; H04L 1/0026; H04L 27/2608
USPC ............... 455/69, 509, 449, 522, 436, 127.1; 370/311, 318, 332
See application file for complete search history.

(56) References Cited

U.S. PATENT DOCUMENTS

| | | | |
|---|---|---|---|
| 8,676,220 B2 * | 3/2014 | Kim et al. ...................... 455/449 |
| 2008/0123576 A1 | 5/2008 | Son et al. |
| 2008/0298287 A1 | 12/2008 | Martinez-Perez et al. |
| 2010/0062725 A1 * | 3/2010 | Ryu et al. ......................... 455/69 |
| 2010/0254291 A1 * | 10/2010 | Youn et al. ..................... 370/311 |
| 2011/0032860 A1 | 2/2011 | Kojima |
| 2011/0128901 A1 * | 6/2011 | Lee et al. ....................... 370/311 |
| 2012/0198253 A1 * | 8/2012 | Kato et al. ..................... 713/320 |
| 2012/0322445 A1 * | 12/2012 | Kwon et al. ................... 455/436 |

OTHER PUBLICATIONS

PCT Intl Search Report and Written Opinion mailed Jan. 30, 2013 for PCT application No. PCT/US12/51418, 9 pages.

* cited by examiner

*Primary Examiner* — Sujatha Sharma
(74) *Attorney, Agent, or Firm* — Lee & Hayes, PLLC

(57) ABSTRACT

Techniques for allocating network resources of a communications network are described. A network resource scheduler allocates communication bursts to telecommunications devices in a manner so as to conserve power of the mobile telecommunication devices. The network resource scheduler may allocate communication bursts such that at least one of the mobile telecommunication devices may enter sleep mode during a current communications block and be awoken prior to a subsequent communications block.

20 Claims, 9 Drawing Sheets

POWER SAVING IN A TELECOMMUNICATIONS NETWORK

CROSS-REFERENCE TO RELATED APPLICATIONS

This application claims benefit, under 35 U.S.C. §119(e), of U.S. Provisional Patent Application No. 61/525,098, filed Aug. 18, 2011, which is incorporated herein, by reference, in its entirety.

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist in a myriad of form factors, such as traditional landline phones, cordless phones, cellular phones, smart phones, personal digital assistant (PDA) phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. These very sophisticated devices, however, consume more power than telecommunications devices have historically consumed, leading to usability issues as consumers are often confronted with low batter warnings and non-functional devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 1 illustrates an example network architecture that includes a telecommunications device configured to switch between power modes and elements of a telecommunications network that the telecommunications device is coupled to.

DETAILED DESCRIPTION

Figure 1:
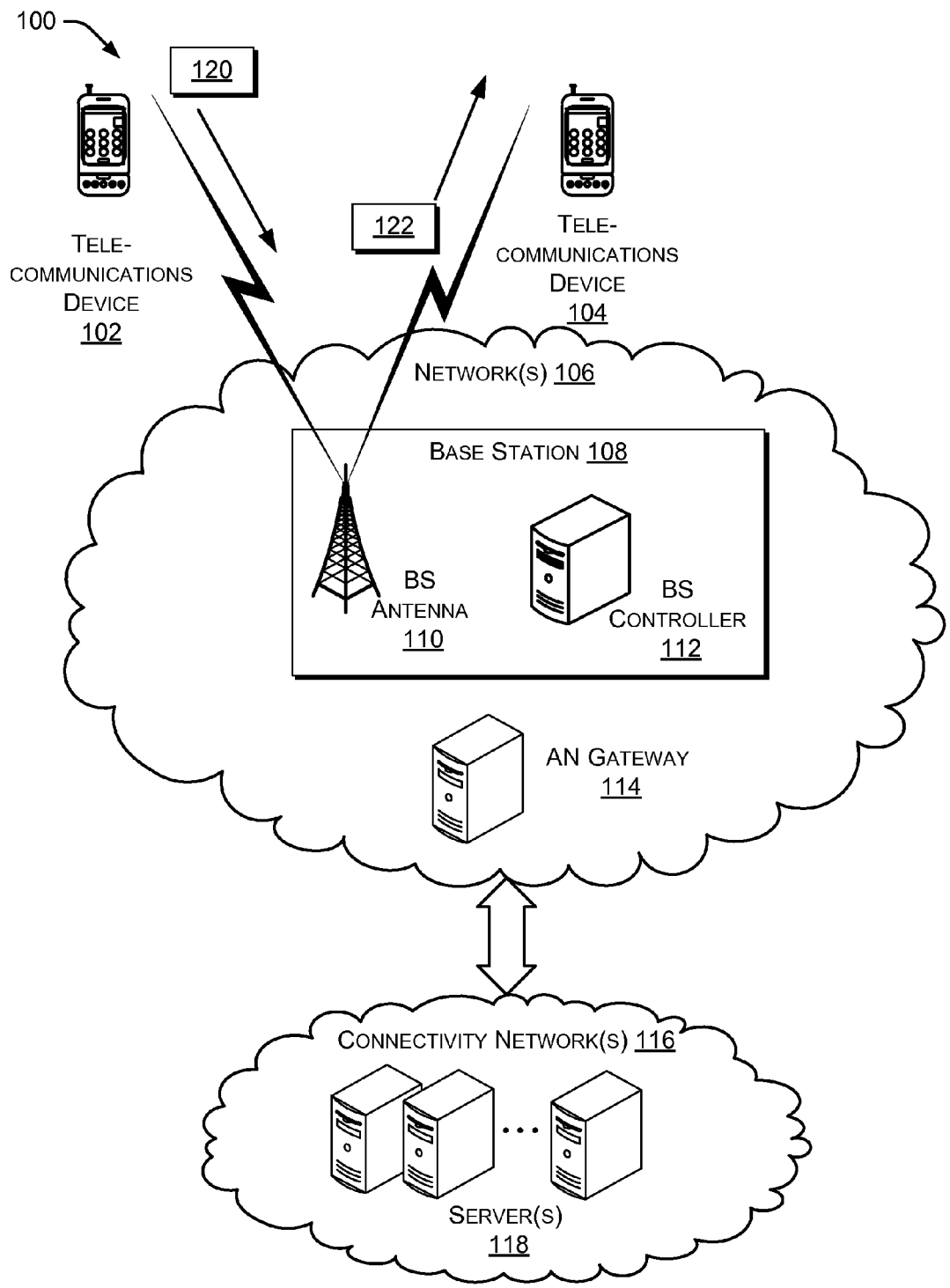

This disclosure is directed to systems and methods for enabling telecommunications devices to switch between power modes during a communications block. As discussed below, a communications block is of fixed duration and may be comprised of one or more frames. These frames may be similar to frames employed by Worldwide Interoperability for Microwave Access (WiMax) and Long Term Evolution (LTE), as well as frames used in other types of telecommunication networks.

The systems and methods described in this disclosure provide ways for a network resource scheduler, which may be located at a base station controller, to schedule network resource allocations (or communication bursts) in a manner such that at least one telecommunications device may enter sleep mode during a communications block.

The systems and methods described in this disclosure provide ways for a telecommunications device to be placed in sleep mode, where modules and/or circuitry of the telecommunications device are powered down such that, while in sleep mode, the telecommunications device is unable to receive communications from or provide communicates to the base station.

In some embodiments, the network resource scheduler may allocate network resources based at least in part on power management for the telecommunications devices. In some instances, the network resource scheduler may allocate network resources to a telecommunications device based at least in part on temporal relationships for the allocations. For example, the network resource scheduler may cluster, in time, allocated network resources for a telecommunications device such that the allocated network resources occur in a relatively small portion of a communications block.

In some embodiments, the network resource scheduler may estimate whether an energy savings may occur by placing a telecommunications device into sleep mode during a communications block. The network resource scheduler may estimate an amount of energy saved by placing the telecommunications device into sleep mode during an interval of time in which there are no network resources allocated to the telecommunications device for the current communications block. The network resource scheduler may estimate an amount of energy expended by awakening the telecommunications device, from sleep mode, when, or shortly prior to, commencement of an allocated network resources for the telecommunications device during the current communications block.

In some embodiments, a telecommunications device may determine whether to enter sleep mode based at least in part on information from the network scheduler. In some instances, a telecommunications device may receive, from the network scheduler, a power-mode indicator, which may indicate that the telecommunications device should enter sleep mode. In some instances, a power-mode indicator may also indicate when the telecommunications device should enter sleep mode.

In some embodiments, a telecommunications device may estimate whether an energy savings may occur by entering into sleep mode during a communications block. The telecommunications device may estimate an amount of energy saved by entering into sleep mode during an interval of time in which there are no network resources allocated to the telecommunications device for the current communications block.

The systems and methods described herein may be implemented in a number of ways. Example implementations are provided below with reference to the following figures.

Example Network Architecture

FIG. 1 illustrates an exemplary architecture 100 for implementing power mode switching on telecommunications devices. The exemplary architecture 100 shows, telecommunications devices 102, 104, which are capable of connecting to one or more networks, as represented by access network 106.

The access network 106 is representative of any one or combination of multiple different types of networks, interconnected with each other and functioning as a single large network (e.g., circuit-switched telephone networks or IP-based packet-switch networks). The access network 106 may also include wire-based networks (e.g., PSTN, IP-based, etc.) and wireless networks (e.g., cellular, satellite, IP-based, etc.).

The access network 106 may use any number of protocols and configurations to enable the telecommunications devices 102, 104 to access other devices and resources. The access network 106 may include several types of circuit-switched telephone networks, such as Public Switched Telephone Network (PSTN) and packet-switched networks, such as the Internet. For example, the network 106 may include a Global System for Mobile Communication (GSM) network, a Code Division Multiple Access (CDMA) network, an Enhanced Data Rates for GSM Evolution (EDGE) network, a Universal Telecommunications System (UMTS) network and/or other types of circuit-switched networks, a Long Term Evolution (LTE) network, a Worldwide Interoperability for Microwave Access (WiMAX) network, the Internet, and/or other packet-switched networks. The access network 106 may also include private networks such as a mobile telephone operator's networks which may use proprietary systems or protocols that are different from the systems or protocols implemented on public networks.

In the case of wireless networks, the access network 106 may include one or more base stations, NodeBs, and eNodeBs 108 (referred to herein as "base stations 108"). Each base station 108 may include a base station antenna 110 and a base station controller or radio network controller 112 (referred to herein as "base station controller 112"). In networks 106 offering LTE connections, the base station controller 112 functionality may be distributed between an eNodeB 108 and a mobility management entity or serving gateway of a core network. Thus, while the base station controller 112 is discussed throughout as being part of a base station 108, it is to be understood that part of the base station controller 112 may be distributed between a base station 108 of an access network 106 and a core network connected to the access network 106. The base station controller 112 may, among other things, schedule network resource allocations. The base station antenna 110 may transmit/receive wireless signals to/from the telecommunications devices 102, 104. The access network 106 may provide, among other things, wireless connectivity with the telecommunications devices 102, 104.

The access network 106 may also include one or more access network gateways (AN-Gateways) 114. The AN-Gateway 114 may, among other things, provide and establish connectivity with a connectivity network 116 (also referred to as a "core network"). The connectivity network 116 may be responsible for establishing connectivity with an IP backbone and may include one or more servers 118. Servers 118 may include Dynamic Host Configuration Protocol (DHCP) servers, Domain Name System (DNS) servers, and Authentication, Authorization, and Accounting (AAA) servers.

The telecommunications devices 102, 104 may provide the base station 108 with network messages 120 for, among other things, registering with the base station 108 and requesting network resources such as network bandwidth resources. In some embodiments, the telecommunications devices 102, 104 may include circuitry and logic with which the telecommunications devices 102, 104 may determine whether or not to enter sleep mode based at least in part on allocations of network resources. For example, the telecommunications device 102 may receive network resource allocations corresponding to one or communication bursts for a current communications block, and determine that for an interval of time, T, starting at time T1 and ending at time T2, there are no network resources allocated to the telecommunications device 102. The telecommunications device 102 may determine to enter sleep mode at time T1 and to awaken from sleep mode at time T2. The telecommunications device 102 may determine to enter sleep mode based at least in part on whether the interval of time (T) is greater than a threshold value. While in sleep mode, the telecommunications device cannot receive communications from, or provide communications to, the base station 108.

The base station 108 may provide the telecommunications devices 102, 104 with network management messages 122 for among other things, allocating network resources that comprise one or more communication bursts and for providing sleep mode indicators. In some instances, a sleep mode indicator may include a flag indicating that the telecommunications device 102, 104 should enter sleep mode. In some instances, a sleep mode indicator may include temporal information such as a time at which the telecommunications device 102, 104 should enter sleep mode, and in some instances, may further include a sleep duration and/or a wake-up time. In some embodiments, the network management messages 122 may carry uplink-maps and downlink-maps.

In some embodiments, the base station controller 112 may include a network resource scheduler that may allocate network resources based at least in part on power management of the telecommunications devices 102, 104. In some embodiments, a computing device such as, but not limited to, AN-Gateway 114 and/or servers 118 may include a network resource scheduler that may allocate network resources based at least in part on power management of the telecommunications devices 102, 104.

Example Base Station Controller

Figure 2:
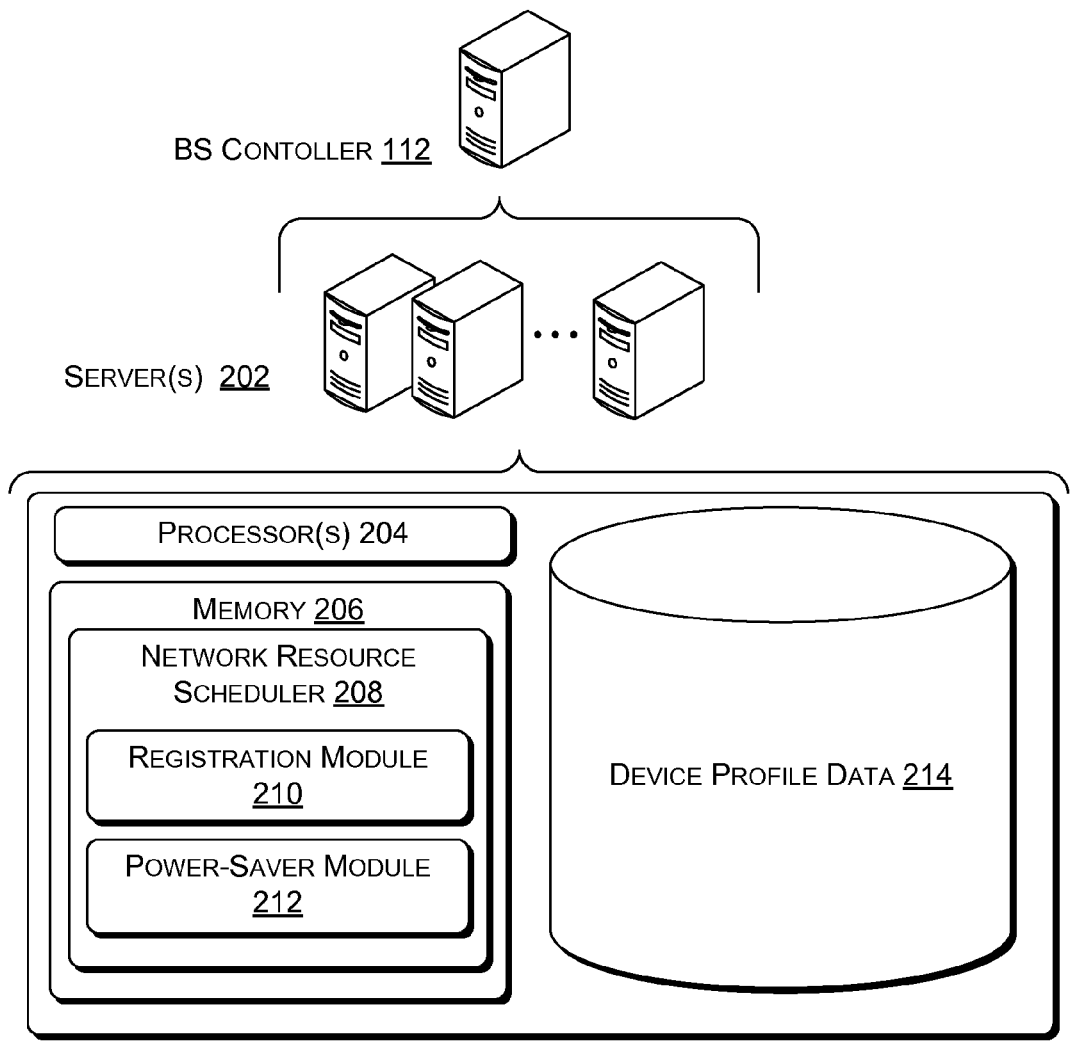
FIG. 2 is a block diagram showing various components of an illustrative base station controller of the telecommunications network shown in FIG. 1.

FIG. 2 shows a base station controller 112 such as might be used in conjunction with the techniques described here.

The base station controller 112 may include one or more servers 202 that include processors(s) 204 and memory 206. The memory 206 may include volatile memory (such as RAM), nonvolatile memory, removable memory, and/or non-removable memory, implemented in any method or technology for storage of information. Also, a processor may include onboard memory in addition to or instead of the memory 206. Some examples of computer-readable storage media which may be included in the memory, and/or processor include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

The memory 206 may store various modules, applications, programs, or other data. The memory 206 may include instructions that, when executed by the processor(s) 204, cause the processors to perform the operations described herein for the base station controller 112. In some embodiments, the memory 206 may store a network resource scheduler application 208. The network resource scheduler application 208 may include a number of modules that perform some or all of the various operations described herein. In accordance with various embodiments, the network resource scheduler application 208 may include some or all of the following modules: a registration module 210 and a power-saver module 212.

In addition, the servers 202 may include data storage for device profile data 214. Device profile data 214 may include energy consumption characteristics of telecommunications devices 102, 104.

The network resource scheduler 208 may schedule allocations of network resources. The network resource scheduler 208 may schedule when the telecommunications device 102, 104 may receive communications from the base station 108 and when the telecommunications device 102, 104 may transmit communications to the base station 108. The network resource scheduler 208 may also schedule the number of connections, between the telecommunications device 102, 104 and the base station 108, for receiving and transmitting communications.

The registration module 210 may enable the telecommunications devices 102, 104 to register with the base station 108 for, among other things, receiving network resource allocations. A telecommunications device 102, 104 may provide device identification information to the base station 108 during registration. The device identification information may identify a manufacturer and model for the telecommunications device 102, 104.

The power-saver module 212 may calculate whether an energy savings may occur by placing the telecommunications device 102, 104 into sleep mode during a communications block. In some instances, the power-saver module 212 may calculate whether the energy savings based at least in part on the device profile data 214. The power-saver module 212 may retrieve energy consumption characteristics from the device profile data 214 based at least in part on device identification information. In some embodiments, the device profile data 214 may include a generic device profile which provides energy consumption characteristics for a generic telecommunications device.

The power-saver module 212 may calculate whether an energy savings may occur by placing a telecommunications device k into sleep mode during a communications block based at least in part on a calculation of an activation energy, EA(k), i.e., energy consumed by wakening the telecommunications device k:

$$EA(k)=Ecpu(k)+Erf(k)+\Sigma_l Es(k,l) \qquad \text{eq. (1)},$$

where Ecpu(k) is the average energy consumed by awakening a processor and core circuits of a telecommunications device k, Erf(k) is the average energy to recover a radio frequency module or a communications module for wireless connectivity, and Es(k,l) is an average energy for recovering communications/application session l of the telecommunications device k, which may be based at least in part on a total number of packets for transmission to, or receiving from, the base station 108.

For an application session l, there may be S(l) bytes of data to process and send during session recovery, and the average radio transmission rate of the telecommunications device k at time t may be r(t). Assuming one acknowledgment (ACK) is sent for every M sent data packets, then there are R(l) ACKs bytes to process and receive when the telecommunications device k is awoken from sleep mode. In that case, $$R(l)=(S(l)\times N)/(r(t)\times P\times M) \qquad \text{eq. (2)},$$

where P is the packet size used in transmission, and N is the average size of the ACK packet.

Then, the energy consumption of application session Es(k, l) is given by:

$$Es(k,l)=S(l)\times Pt+((S(l)\times N)/(r(t)\times P\times M))\times Pr \qquad \text{eq. (3)},$$

where Pt is the power value for transmitting packets and Pr is the power value for receiving packets.

The power-saver module 212 may determine whether to provide a sleep indicator for a telecommunications device based at least in part on a length of a time interval (Tnnra) in which the telecommunications device has no network resources allocated (nnra). If the telecommunications device is placed in an idle power mode (Pi), then the amount of energy that the telecommunications device will consume (Ec) during interval Tnnra will be given by $$Ec=Pi\times Tnnra \qquad \text{eq. (4)}.$$

The power-saver module 212 may determine to switch the telecommunications device into sleep mode if $$Pi\times Tnnra>(Tnnra-\tau)\times Ps+Er \qquad \text{eq. (5)},$$

where $\tau$ is an average recovery time from sleep mode to idle mode and Ps is the power value of the telecommunications device in sleep mode.

Tmin is the minimum time interval for which it is feasible to save power by placing the telecommunications device into sleep mode and is given by:

$$Tmin=(Er-Ps\times\tau)/(Pi-Ps) \qquad \text{eq. (6)}.$$

Although the application and modules are shown under the servers 202 in FIG. 2, the application and/or modules may be distributed across various servers and/or locations in some embodiments.

Telecommunications Device

Figure 3:
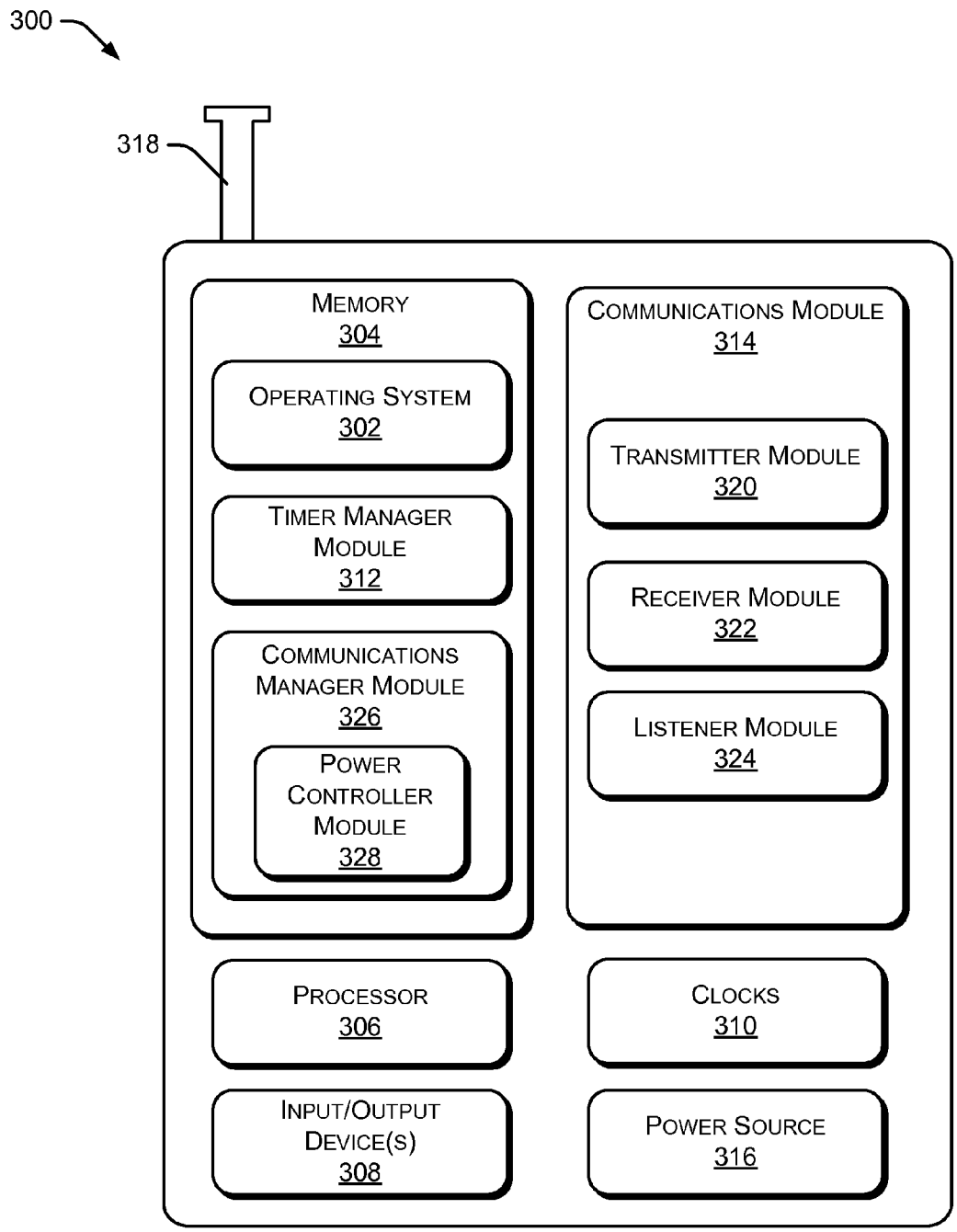
FIG. 3 is a block diagram showing various components of an illustrative telecommunications device.

FIG. 3 shows a telecommunications device 300 such as might be used in conjunction with the techniques described here. In many cases, telecommunications device 300 will be what is commonly referred to as a "cell phone," although the described techniques can be used in conjunction with any telecommunications device.

Telecommunications devices are frequently capable of both voice and data communications, using various different modes of such communications. A conventional telephone call normally involves real-time, duplex, synchronous voice communications, in which all participants hear the other participants in real time, all participants can simultaneously speak, and all participants are actively engaged and respond directly and immediately to each other without significant interruption.

Telecommunications devices vary in complexity and capabilities, from simple devices that support only voice communications, to very sophisticated devices with capabilities approaching those of personal computers. Higher-end telecommunications devices are often identified as smart phones although increasingly are identified as desktop and portable computers, netbooks, etc.

The telecommunications device 300 typically has an operating system 302 executed from some form of solid-state memory 304 by one or more processors 306. Custom software is preloaded onto the device to perform various functions and to support the different communication modes described above. Many telecommunications devices allow the user to customize the device through configuration options or by adding third-party software. Such software is available for many different functions, not limited to communications.

The user interfaces of telecommunications devices vary widely. The user interfaces include input/output devices 308. The most basic input/output devices 308 might include a numeric telephone-type keypad, to which has been added "talk" and "end" buttons for controlling voice calls, and a basic output device consisting of a single-line display for indicating telephone numbers. Other input/output devices 308 might include touch-screen interfaces, alpha-numeric keypads, a microphone, and other forms of input devices. Input/output devices 308 may also include display screens, speakers, and other forms of output devices.

The telecommunications device 300 may include one or more clocks 310. Among other things, the clocks 310 may facilitate synchronization with the base station 108. In some instances, the memory 304 may include a timer manager module 312. The timer manager module 312 may set a timer for when the telecommunications device 300 should transition from a first power mode to a second power mode and set an alarm for when the telecommunications device 300 should transition from the second power level another power mode such as the first power mode. For example, the timer manager module 312 may set a timer for when the telecommunications device 300 should transition from a high power mode to a sleep mode and set an alarm for when the telecommunications device 300 should transition from the sleep power level to the high power mode.

The telecommunications device 300 also includes communications module 314, an onboard power source 316, and an antenna 318. The power source 316 may be a battery that powers the telecommunications device 300. The antenna 318 receives and transmits radio frequency signals.

The communications module 314 may include circuitry and logic that provides signal processing including modulation and demodulation such as, but not limited to, binary phase shift keyed (BPSK), quadrature phase shift keyed (QPSK), and quadrature amplitude modulation (QAM). The communications module 314 may be placed in multiple power modes including (from lowest energy consumption to highest energy consumption): sleep mode, idle power mode, receive power mode, and transmit power mode. In sleep mode the communications module 314 may be non-operable. In some instances, the telecommunication device 300 may turn off most portions of circuitry of the telecommunication device 300 such as the communications module 314 and the input/output devices 308, and may save information to the memory 304 for when the telecommunications device is reawaken.

The communications module 314 may include a transmitter module 320, a receiver module 322, and a listener module 324. The transmitter module 322 processes data into radio frequency signals for transmission from the antenna 318 and operates at the transmit power mode. The receiver module 322 processes radio frequency signals, received by the antenna 318, to recover information encoded into the received radio frequency signals and operates at the transmitter mode. The listener module 324 may operate at the idle power mode and may include circuitry and logic that listening for radio frequency signals. The listener module 324 may provide a signal to a communications manager module 326 in response to receiving a radio frequency signal from the antenna 318. In idle power mode, the listener module 324 can listen to the antenna 318, but there is no data processing.

The communications manager module 326 may be stored in the memory 304. Among other things, the communications manager module 326 may determine when the communications module 314 should be changed from one power mode to another power mode. In some instances, the communications manager module 326 may determine to switch the communications module 314 from one power mode to another power mode based at least in part on information provided by the base station 108. For example, the communications manager module 326 may determine to switch the communications module 314 from an operational power mode (i.e., idle power mode, medium power mode, high power mode) to a non-operational power mode (e.g., sleep mode). In a non-operational power mode, the communications module 314 cannot transmit, receive, or listen for radio frequency signals. The communications manager module 326 may include a power controller module 328. The power controller module 328 may switch the communications module 314 between power modes and may provide signals to the timer manager module 312 for setting clocks and alarms.

Communication Blocks

Figure 4:
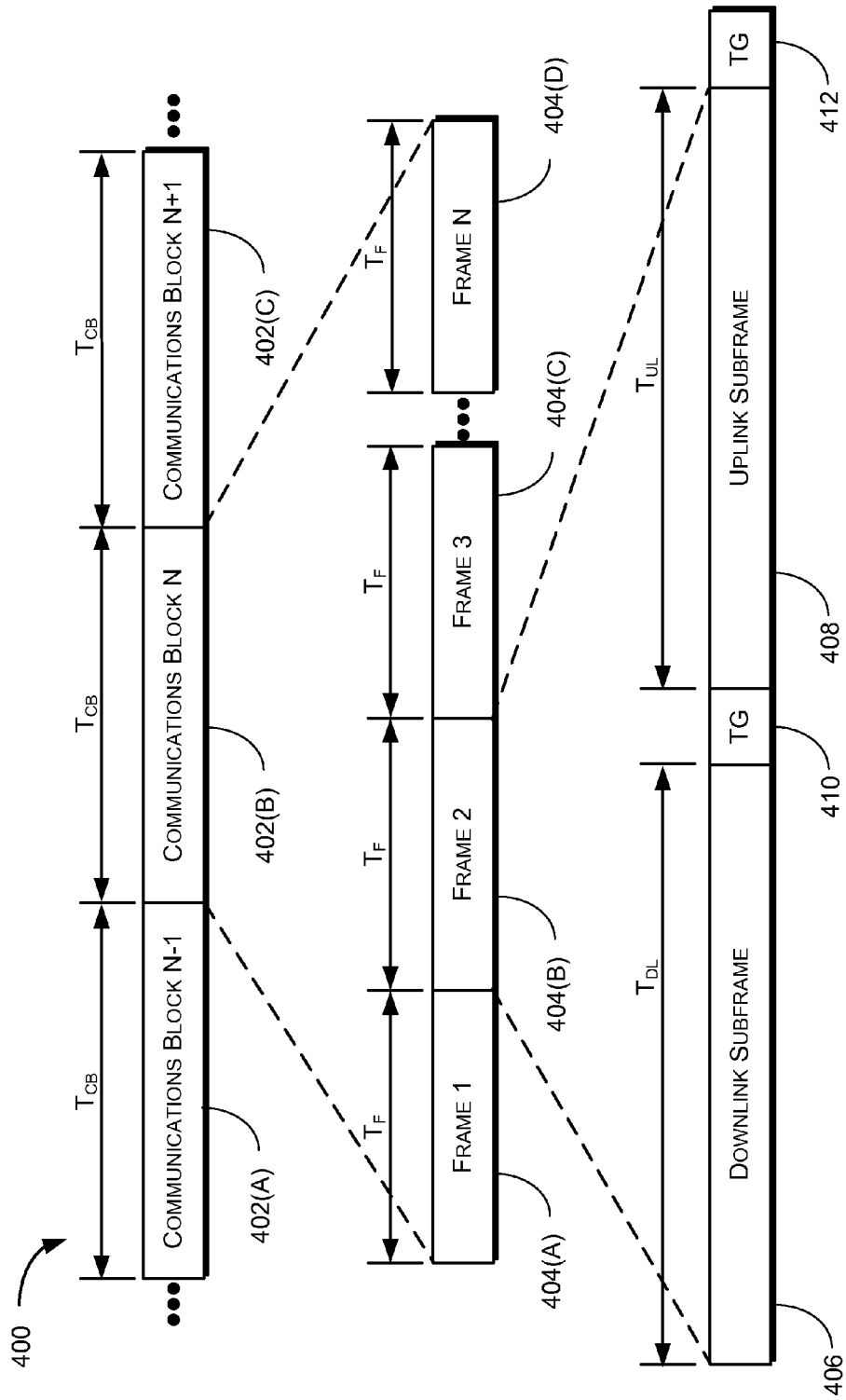
FIG. 4 illustrates a representation of a logical communication block.

FIG. 4 shows a logical representation of a train 400 of communication blocks, individually referenced as 402(A)-402(C) and collectively referenced as 402. Each communication block 402 has a period of $T_{CB}$, and may be comprised of N frames, individually referenced as 404(A)-404(D) and collectively referenced as 404, where N is an integer greater than or equal to 1. Typically, the number of frames 404 that make up a communication block 402 is greater than 1. In some embodiments, a communication block 402 may be made up of a single frame 404, and in such embodiments, telecommunication devices 102, 104, 300 may enter sleep mode during the single frame 404. For the purposes of this disclosure, a communications block has a fixed duration, $T_{CB}$, during which one or more telecommunications devices 102, 104, 300 receive and provide at least one communication over the communications network 106.

A frame 404 may be comprised of slots in both time and/or frequency. The frame 404 may be divided into segments in the frequency domain and into zones in the time domain. The frame 404 may have a structure that may be based at least in part on a communication operation. For example, the frame 404 may have a first structure if the communications network 106 employs time-division-duplex (TDD) operations and a second structure if the communications network 106 employs frequency-division-duplex (FDD) operations.

In some embodiments, each of the frames 404 of a communications block 402 may be of equal duration, having a periodicity of $T_F$, where $T_F=T_{CB}/N$. As discussed below, frames 404 may have equal duration for providing backward compatibility such that telecommunications devices that are not equipped with power control functionality discussed herein may still utilize the communications network 106. However, in some embodiments, the frames 404 may be of flexible duration, $T_F(i)$, with the constraint that the duration of the communications block 402 remains constant, i.e., $T_{CB}=\Sigma_{i=1}^{N}(i)$.

A frame 404 may be comprised of a downlink subframe 406 and an uplink subframe 408. The base station 108 provides downstream communications to the telecommunications devices 102, 104 over the communications network 106 during the downlink subframe 406, and during the uplink subframe 408, the telecommunications devices 102, 104 may provide the base station 108 with upstream communications over the communications network 106. The downlink subframe 406 and the uplink subframe 408 may have a duration of $T_{DL}$, and $T_{UL}$, respectively. In some embodiments, the downlink subframe 406 and the uplink subframe 408 may be of flexible duration.

The frame 404 may include timing guards 410 and 412. Timing guard 410 may interpose the downlink subframe 406 and the uplink subframe 408. Timing guard 412 may be after the uplink subframe 408.

Structures of Frames

Figure 5:
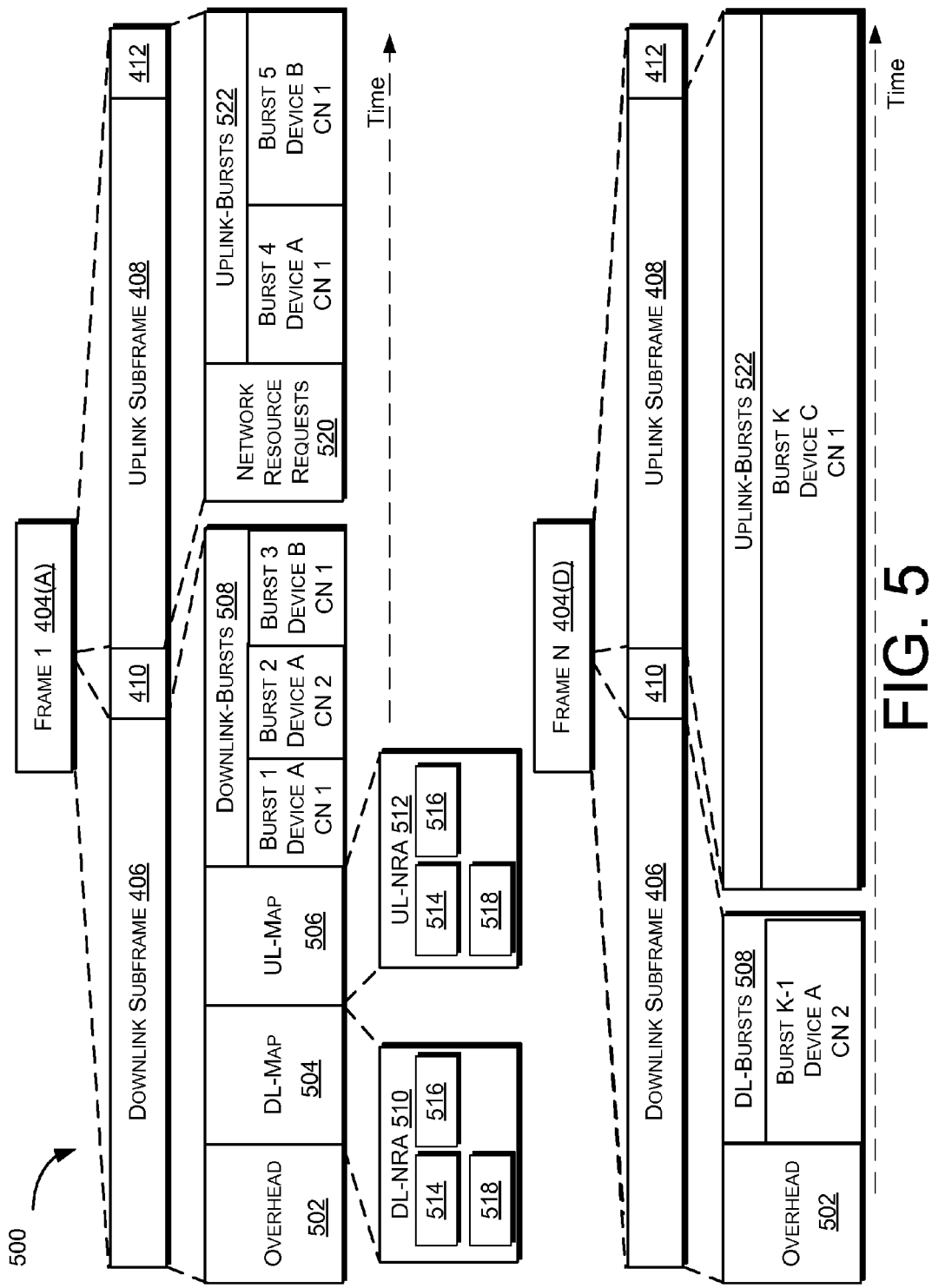
FIG. 5 is an example of logical structure of frames of a communication block according to one embodiment.

FIG. 5 illustrates an embodiment of a logical structure diagram 500 of frames 404(A) and 404(D), in which frames 404(A) and 404(D) are the first and the $n^{th}$ frames, respectively, in a communications block 402.

The downlink subframe 406 of frame 404(A) includes a number of segments such as overhead segment 502, downlink (DL)-Map 504, uplink (UP)-Map 506, and downlink bursts 508. The overhead segment 502 includes various communications network features and functions. During the overhead segment 502, the base station 108 transmits a preamble signal which contains information about downlink synchronization. The overhead segment 502 may also include a frame control header, which may include frame configuration information such as modulation and coding schemes, length of DL-Map 504 and UL-Map 506, and usable subcarriers, etc.

The DL-map 504 and the UL-map 506 carry downlink network resource allocations 510 and uplink network resource allocations 512, respectively. Information carried by the downlink network resource allocations 510 and uplink network resource allocations 512 may include identifier information 514 and burst information 516. Identifier information 514 may include device identifiers for a telecommunication device. Burst information 516 may include connection information, network resource information, and timing information. The connection information may identify a communication connection between a telecommunication device 102, 104 and the base station 108. The network resource information may identify channels, subchannels, frequencies, etc. over which communications are to occur during the corresponding communication bursts. The timing information may identify when the corresponding communication bursts are scheduled to occur, and in some instances, the timing information may indicate one or more frames 404 in the communications block 402 in which the communication bursts are scheduled to occur.

In some embodiments, the DL-map 504 and/or the UL-map 506 may include power-mode indicator 518. Power-mode indicator 518 may indicate one or more power-level settings and timing information for when the telecommunications device 102, 104 should switch power levels. For example, the power-mode indicator 518 may indicate that a telecommunications device 102, 104 should enter sleep mode at the beginning of downlink-bursts 508 of frame 404(A), i.e., the first frame of communications block 402(B), and should awaken from sleep mode at a specified time in a subsequent frame such as frame 404(C), i.e., the third frame of communications block 402(B). In some embodiments, power-mode information may be provided to telecommunications devices 102, 104 during downlink bursts 508.

Downlink-bursts 508 is illustrated as being comprised of three bursts, burst 1, burst 2, and burst 3. Such illustration is done for the sake of clarity and provides a non-limiting example. Telecommunications device A, such as telecommunications device 102, receives communications from the base station 108 over its connection 1 and its connection 2 during bursts 1 and 2, respectively. Telecommunications device B, such as telecommunications device 104, receives communications from the base station 108 over its connection 1 during burst 3.

The uplink subframe 408 of frame 404(A) includes a number of segments such as network resource requests 520 and uplink bursts 522. During the network resource requests 520, the telecommunications devices 102, 104 may provide the base station 108 with network resource request messages. In some embodiments, the base station 108 may allocate network resources, for the subsequent communications block 402(C), to the telecommunication devices 102, 104 based at least in part on the network resource request messages. However, in some embodiments, the overhead segment 502 may also include the network resource requests 520, and in such embodiments, the base station 108 may allocate network resources, for the current communications block 402(B), to the telecommunication devices 102, 104 based at least in part on the network resource request messages.

Uplink-bursts 522 of frame 404(A) is illustrated as being comprised of two bursts: burst 4 and burst 5. Such illustration is done for the sake of clarity and provides a non-limiting example. Telecommunications device A, such as telecommunications device 102, transmits communications to the base station 108 over its connection 1 during burst 4, and telecommunications device B, such as telecommunications device 104, transmits communications to the base station 108 over its connection 1 during burst 5.

The downlink subframe 406 of frame 404(D) includes an overhead segment 502 and downlink-bursts 508, and the uplink subframe 408 of the frame 404(D) includes uplink-bursts 522. In this illustrated embodiment, the downlink subframe 406 of frame 404(D) does not include the DL-Map 504 or the UL-Map 506, and similarly, the uplink subframe 408 of frame 404(D) does not include network resource requests 510. In such embodiments, telecommunications devices 102, 104 may receive their network resource allocations for the current communications block 402(B) during the first frame, i.e., frame 404(A), of the current communications block 402

(B). Similarly, the telecommunications devices 102, 104 may provide network resource request messages to the base station 108 during the first frame, i.e., frame 404(A), of the current communications block 402(B).

The downlink subframe 406 of frame 404(D) is illustrated as being comprised of a single burst (burst k−1), and the uplink subframe 408 of frame 404(D) is illustrated as being comprised of a single burst (burst k). Telecommunications device A, such as telecommunications device 102 and/or telecommunications device 104, receives communications from the base station 108 over its connection 1 during burst k−1. Telecommunications device C, which may be a telecommunications device similar to telecommunications devices 102, 104, transmits communications to the base station 108 over its connection 1 during burst k.

In this illustrated embodiment, devices A, B and C received their network resource allocations via DL-Map 504 and UL-Map 506 during the first frame, frame 404(A), of the current communications block 402(B), and devices A, B and C may adjust their respective power level settings in accordance with their allocated network resources. For example, after the UL-Map 506, the telecommunications device C may determine that there are no network resources allocated to it until burst k. In that case, telecommunications device C may enter sleep mode during frame 404(A) and then awaken, during frame 404(D), at a time that precedes burst k.

In some instances, telecommunications devices A, B, or C may determine to enter sleep mode during a frame, e.g., frame 404(A), and awaken from sleep mode during the current frame. For example, the telecommunications device B may enter sleep mode, after the UL-Map 506, then reawake in time for burst 3, then re-enter sleep mode after burst 3 and then reawake in time for burst 5.

Figure 6:
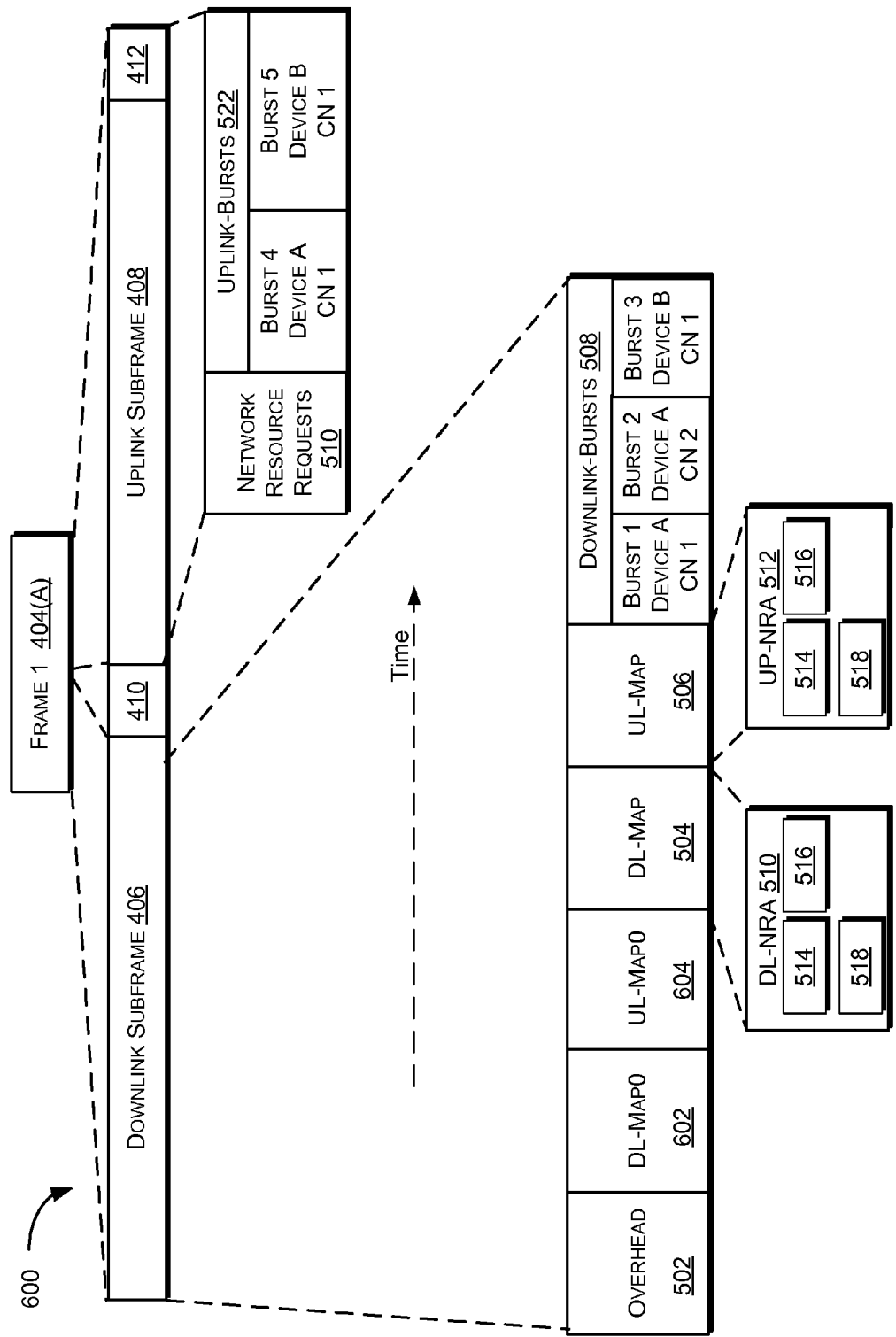
FIG. 6 is an example of logical structure of a frame of a communication block according to one embodiment.

FIG. 6 illustrates another embodiment of a logical structure diagram 600 of frame 404(A), in which frame 404(A) is the first frame in a communications block 402.

In this illustrated embodiment, the downlink subframe 406 includes DL-Map 504, UL-Map 506, DL-Map0 602 and UL-Map0 604. As previously described, DL-Map 504 and UL-Map 506 may carry downlink network resource allocations 510 and uplink network resource allocations 512 for telecommunication devices 102, 104, which are enabled with power-saving features described herein. The DL-Map0 602 and UL-Map0 604 may correspond to a conventional downlink-map and to a conventional uplink-map, respectively, and may be utilized by conventional telecommunications devices (not shown) that are not enabled with power-saving features described herein.

In this embodiment, frames 404(B)-404(D) of the communication block 402 may also include DL-Map0 602 and UL-Map0 604 and network resource requests 510 such that the communications network 106 is backwards compatible with conventional telecommunications devices.

Figure 7:
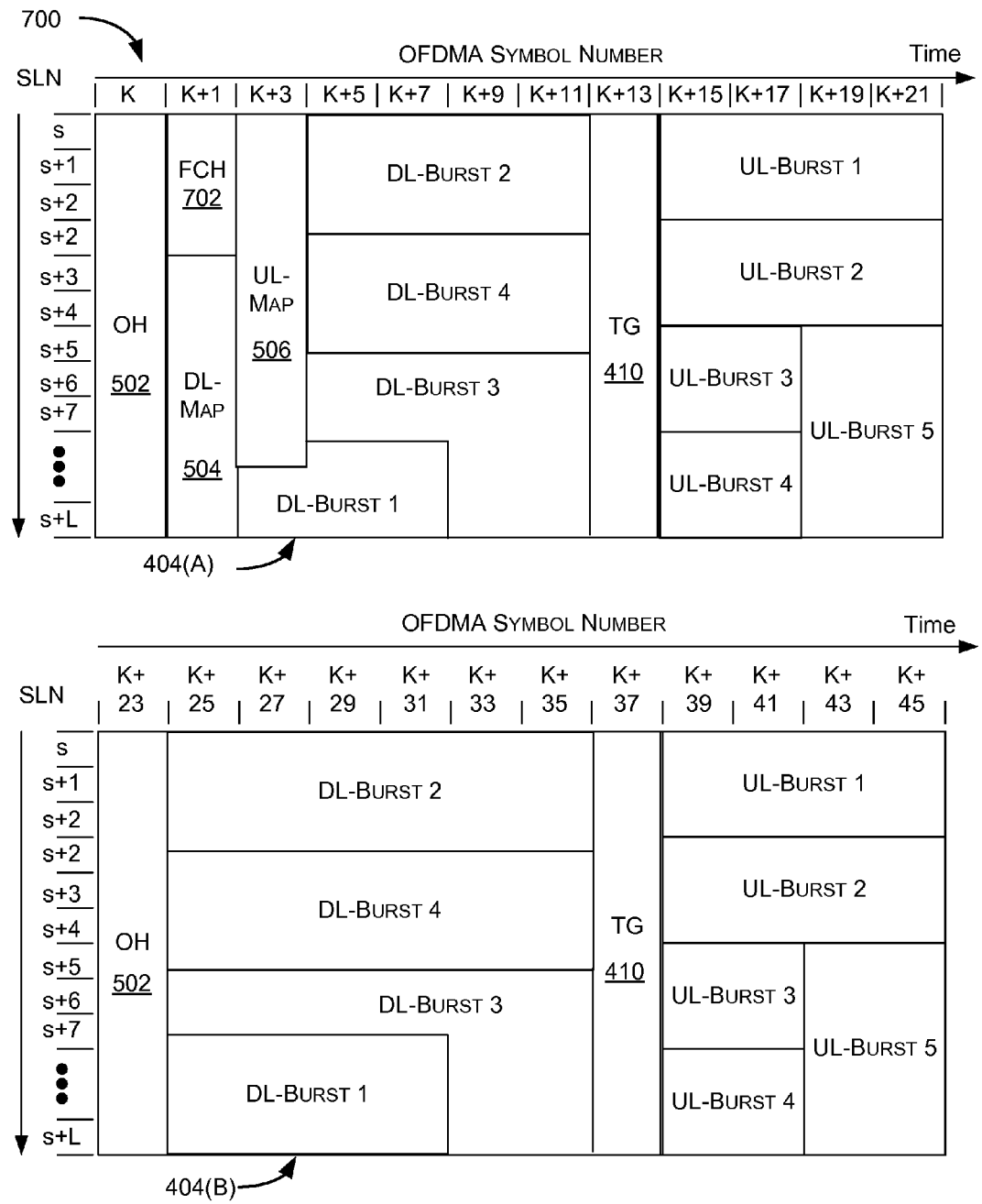
FIG. 7 is an example of logical structure of frames of a communication block according to another embodiment.

FIG. 7 illustrates another embodiment of a logical structure diagram 700 of frames 404(A) and 404(B) of communications block 402, where frames 404(A) and 404(B) are the first and second frames of the communications block 402(B).

In this illustrated embodiment, network resources may be allocated by both symbol number (time) and by subchannel logical numbers (s) (frequency). In this embodiment, overhead 502 may include a timing guard.

Frame 404(A) may include overhead 502, downlink-map 504, uplink-map 506, and frame control header (FCH) 702. The frame control header 702 may include frame configuration information such as modulation and coding schemes, length of DL-Map 504 and UL-Map 506, and usable subcarriers, etc.

Frame 404(A) may also include timing guard 410, which separates downlink network resource allocations (shown as DL-Bursts 1-4) from uplink network resource allocations (shown as UL-Bursts 1-5).

In contrast to frame 404(A), frame 404(B) may, in some instances, not include a frame control header 702, a downlink-map 504, or an uplink-map 506. Allocations for network resources for the entirety of the communications block 402(B) may be carried in the DL-Map 504 and the UL-Map 506 of frame 404(A).

Example Processes

Figure 8:
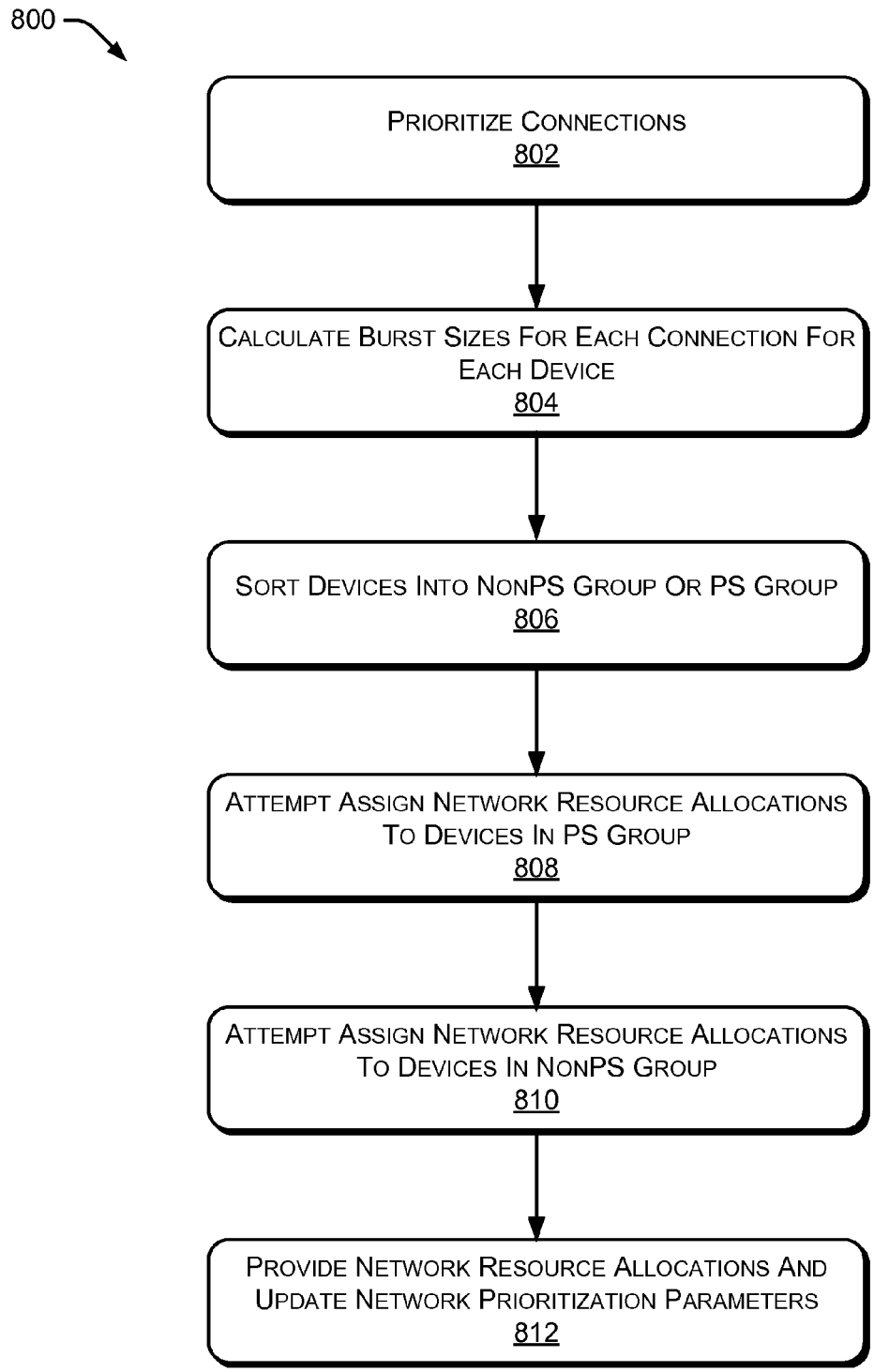
FIG. 8 is a flow diagram of a process for allocating network resources to a telecommunications device.

FIG. 8 shows a process 800 for allocating network resources to a telecommunications device. Process 800 is illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process. For discussion purposes, the processes are described with reference to the network resource scheduler 208 of FIG. 2.

At 802, the network resource scheduler 208 prioritizes connections for telecommunications devices 102, 104. Each telecommunications device 102, 104 may have multiple connections to the base station 108 during a current communications block 402. The network resource scheduler 208 may consider, among other things, quality of service (QoS), feasible throughput, queue wait time, jitter, and other factors in prioritizing the connections for the telecommunications devices 102, 104.

At 804, for each telecommunications device "i," the network resource scheduler 208 calculates burst sizes (both uplink and downlink bursts) for each connection $C_{i,j}$ in the current communications block 402. The network resource scheduler 208 may provisionally allocate the bursts to the telecommunications devices.

At 806, the network resource scheduler 208 sorts the telecommunications devices into either power-saving group or nonpower-saving group. If a telecommunications device is ineligible for power saving in the current communications block, then the telecommunications device may be placed into nonpower-saving group. The telecommunications device may be ineligible for reasons such as not having a power controller module 328 and/or having too many bursts provisionally allocated thereto. For example, the bursts provisionally allocated to the telecommunications device 102 may be more than what the current communications block 402 may accommodate, even if the telecommunications device 102 receives 100% of all bursts (or 100% of all available network bandwidth) in the current communications block 402.

At 808, the network resource scheduler 208 attempts to assign bursts to the telecommunications devices that have been sorted into the power-saving group. The network resource scheduler 208 may allocate bursts based at least on priorities of the connections as determined at 802.

In some embodiments, the network resource scheduler 208 may determine which telecommunications device (device i) (out of all possible telecommunication devices that have connections during the current communication block 402) has an unassigned connection (connection $C_{i,j}$) with the highest priority and may then allocate, if possible, a number of bursts to that telecommunications device (device i) such that all of the connections (connection $C_{i,k}$, where k does not equal j for that that telecommunications device (device i)) are accommodated during the current communications block 402. Upon such allocation, the network resource scheduler 208 may repeat the process for the telecommunications device (device n) that has an unassigned connection (connection $C_{n,j}$) with the current highest priority, and so on.

In some embodiments, the network resource scheduler 208 may attempt to assign bursts to the telecommunications devices by clustering bursts into a frame 404 of a communications block 402. The network resource scheduler 208 may then determine whether either one, or both, of a first time interval (Tcalc1) and a second time interval (Tcalc2) are greater than Tmin, where Tcalc1 is a time difference between a beginning time of the first candidate burst for the telecommunications device (device i) and an ending time of a last network burst (e.g., uplink-map 506), and where Tcalc2 is a time difference between an ending time of the last candidate burst for the telecommunications device (device i) and a beginning time of the next communications block. In the event that either one, or both, of Tcalc1 and/or Tcalc2 is greater than Tmin, the network resource scheduler 208 may then provide a power-mode indicator indicating that the telecommunications device (device i) should enter sleep mode and may then assign the candidate bursts to the telecommunications device (device i). The network resource scheduler 208 may then save the telecommunications device (device i) into an assigned power-saving group and update network resource maps such as an uplink network resource map and/or a downlink network resource map accordingly. In the event that the neither Tcalc1 nor Tcalc2 is greater than Tmin, the network resource scheduler 208 may then save the telecommunications device (device i) into the nonpower-saving group.

In some embodiments, the network resource scheduler 208 may attempt to assign bursts to the telecommunications devices by sequentially clustering bursts into the frames 404(A)-404(D) of a communications block 402. The network resource scheduler 208 may attempt to cluster candidate bursts for a telecommunications device (device i) into frame 404(A), as discussed above. If the candidate bursts for the telecommunications device (device i) cannot be clustered into frame 404(A), the network resource scheduler 208 may attempt to cluster candidate bursts into the subsequent frame 404(B), and if unsuccessful, the network resource scheduler 208 may attempt to cluster candidate bursts into each subsequent frame 404 of the current communications block 402 until it is successful or until there are no remaining frames 404 in the current communications block. If successful, the network resource scheduler 208 may then provide a power-mode indicator indicating that the telecommunications device (device i) should enter sleep mode and may then assign the candidate bursts to the telecommunications device (device i) for the appropriate frame 404 of the current communications block 402, save the telecommunications device (device i) into an assigned power-saving group, and update network resource maps such as an uplink network resource map and/or a downlink network resource map accordingly. If successful, the network resource scheduler 208 may save the telecommunications device (device i) into the nonpower-saving group.

In some embodiments, the network resource scheduler 208 may attempt to assign bursts to the telecommunications devices by clustering downlink bursts into a first frame, e.g., frame 404(A), of a communications block 402 and clustering uplink bursts into another frame, e.g., frame 404(D), of the communications block 402. The network resource scheduler 208 may then determine whether at least one of Tcalc1, Tcalc2, or Tcalc3 is greater than Tmin, where Tcalc3 is a time difference between a beginning time of the first candidate uplink burst for the telecommunications device (device i) and an ending time of the last candidate downlink burst for the telecommunications device (device i). (In the event that uplink bursts are transmitted before downlink bursts, then Tcalc3 is a time difference between a beginning time of the first candidate downlink burst for the telecommunications device (device i) and an ending time of the last candidate uplink burst for the telecommunications device (device i).) The network resource scheduler 208 may then save the telecommunications device (device i) into an assigned power-saving group and update network resource maps such as an uplink network resource map and/or a downlink network resource map accordingly. In the event that the neither Tcalc1, nor Tcalc2, nor Tcalc3 is greater than Tmin, the network resource scheduler 208 may then save the telecommunications device (device i) into the nonpower-saving group.

In some embodiments, the network resource scheduler 208 may attempt to assign bursts to the telecommunications devices based at least in part on the number of connections (connection $C_{i,j}$) and connection priorities. The network resource scheduler 208 may first assign bursts for the telecommunications devices that have a lowest number of connections based at least on the connection priorities and may then assign bursts for the telecommunications devices that have a next lowest number of connections based at least on the connection priorities. For example, the network resource scheduler 208 may first assign bursts for the telecommunications devices that have a single connection (either one uplink burst or one downlink burst) and may then assign bursts for the telecommunication devices that have two connections, and so on. When the network resource scheduler 208 successfully assigns candidate bursts, the network resource scheduler 208 may update network resource maps such as an uplink network resource map and/or a downlink network resource map accordingly and provide a power-mode indicator. When the network resource scheduler 208 cannot successfully assign candidate bursts to a telecommunications device (device i), the network resource scheduler 208 may then save the telecommunications device (device i) into the nonpower-saving group.

At 810, the network resource scheduler 208 may attempt to assign candidate bursts to the telecommunications devices that are saved in the nonpower-saving group. When the network resource scheduler 208 successfully assigns candidate bursts, the network resource scheduler 208 may update network resource maps such as an uplink network resource map and/or a downlink network resource map accordingly.

At 812, the network resource scheduler 208 may update network prioritization parameters such as average throughput, average delay, average jitter of each connection and may provide allocated network resources to the telecommunications devices 102, 104. The allocated network resources may be provided to the telecommunications devices 102, 104 via downlink-maps and/or uplink-maps.

Figure 9:
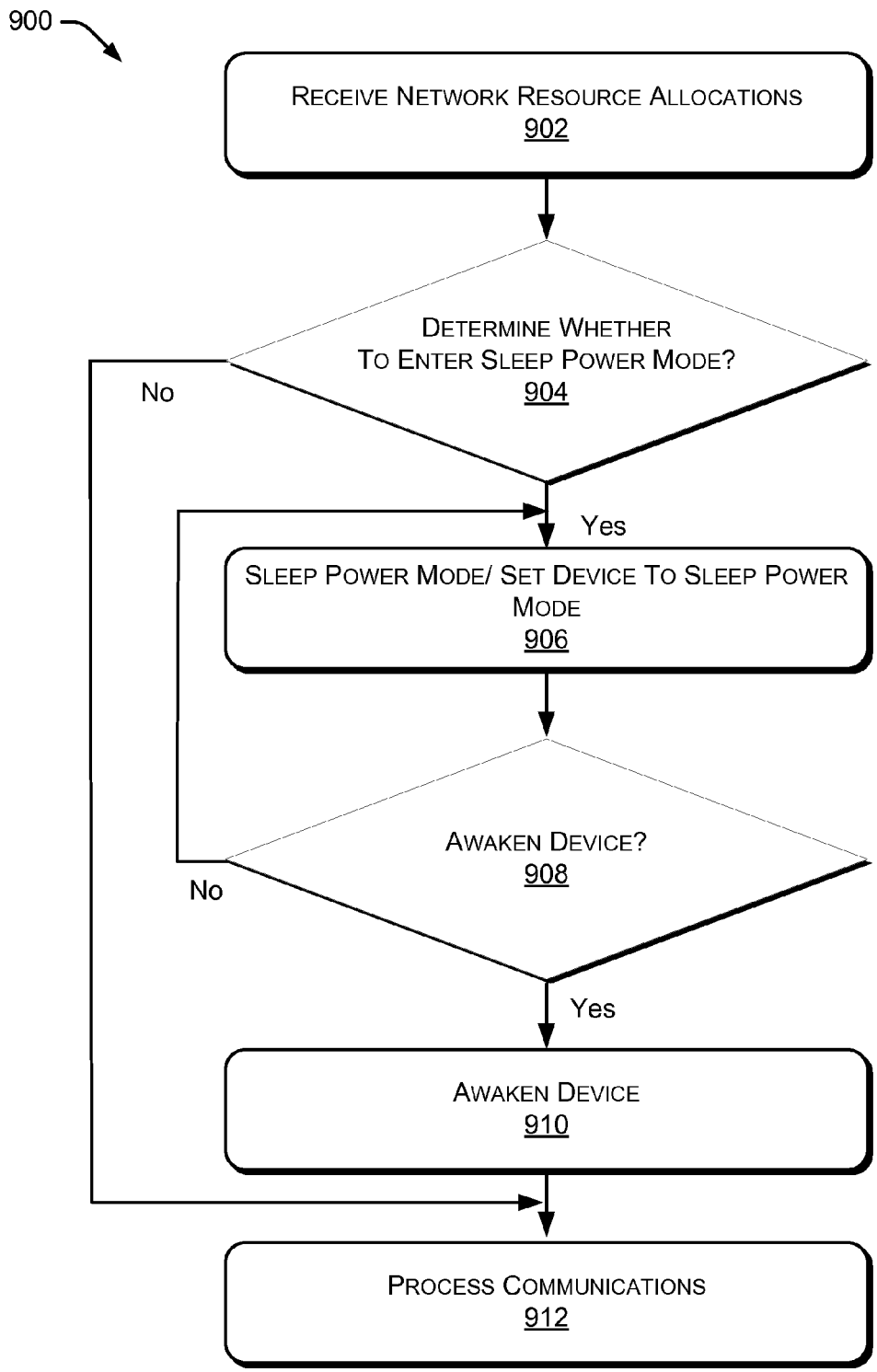
FIG. 9 is a flow diagram of a process for placing a telecommunications device into sleep mode.

FIG. 9 shows a process 900 for placing the telecommunications device 300 into sleep mode. Process 900 is illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process. For discussion purposes, the processes are described with reference to the communications manager module 326 of FIG. 2.

At 902, the communications manager module 326 receives a network resource allocations message. The network resource allocations message may be carried in a downlink-map, an uplink-map, or both.

At 904, the communications manager module 326 may determine whether the communications module 314 should be placed in sleep mode during a current communications block 402. If the determination is to enter sleep mode, the process continues at 906, otherwise, the process continues at 912.

In some embodiments, the network resource allocations message may include a power-mode indicator that indicates whether the communications module 314 should be placed in sleep mode. In some instances, the power-mode indicator may indicate a sleep-time. In some instances, the power-mode indicator may indicate a sleep-time and a wake-time or a sleep duration time. The communications manager module 326 may determine whether the communications module 314 should be placed in sleep mode during a current communications block 402 based at least on the power-mode indicator.

In some embodiments, the communications manager module 326 may calculate no-network-resources-allocated intervals (Tnnra) based on the network resource allocations message. In some instances, the communications manager module 326 may determine whether a calculated no-network-resources-allocated interval (Tnnra) is greater than a threshold interval and may determine to place the communications module 314 in sleep mode responsive to the calculated no-network-resources-allocated interval (Tnnra) being greater than the threshold interval. In some instances, the threshold interval may be Tmin as given by equation 6.

At 906, the communications module 314 is in sleep mode. The communications manager module 326 may provide sleep information to the timer manager module 312 and control signals to the communications module 314, which place the communications module 314 into the sleep mode. The timer manager module 312 and set clocks 310 to time when the communications module 314 should be awoken.

At 908, the communications manager module 326 may determine whether to awaken the communications module 314. The determination may be based upon whether the communications manager module 326 receives a control signal from the timer manager module 312. If the determination is negative, the process continues at 906, where the communications module 314 remains in sleep mode. If the determination is affirmative, the process continues at 910.

At 910, the communications module 314 is awoken and is placed in the appropriate power mode. The communications module 314 may be placed in idle power mode, receive power mode, or transmit power mode.

At 910, the communications module 314 processes communication packets.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media having computer-executable instructions thereon which, when executed by a computing device, implement a method of scheduling, for a plurality of telecommunications devices, network resource allocations during a current communications block of a train of communications blocks, the method comprising:

for the current communications block and for each telecommunications device of the plurality of telecommunications devices,
determining whether a respective telecommunications device may save energy by entering sleep mode during a time interval in which network resources are not allocated to the respective telecommunications device, the time interval being at least one of: (a) before an earliest candidate communication burst commences; (b) after a last candidate communication burst ends; and (c) between an end of a first candidate communication burst and a beginning of a second candidate communication burst, where the second communication burst is immediately subsequent to the first communication burst, and
assigning at least one candidate communication burst to the respective telecommunications device in response to determining that the telecommunications device may save energy during the time interval by entering sleep mode.

2. The one or more non-transitory computer-readable storage media of claim 1, the method further comprising:
updating at least one of at least one network resource allocation map in response to assigning the at least one candidate communication burst to the respective telecommunications device, wherein the network resource allocation map carries network resource allocations for at least one of uplink communication bursts and downlink communication bursts; and
providing the plurality of telecommunications devices with the network resource allocation map.

3. The one or more non-transitory computer-readable storage media of claim 1, further comprising:
providing each of the plurality of telecommunications devices with a corresponding power-mode indicator for indicating that the telecommunications device should enter sleep mode during the current communications block.

4. The one or more non-transitory computer-readable storage media of claim 3, wherein the power-mode indicator indicates when the telecommunications device should enter sleep mode.

5. The one or more non-transitory computer-readable storage media of claim 4, wherein the power-mode indicator indicates either a wake-time or a duration for the sleep mode.

6. The one or more non-transitory computer-readable storage media of claim 1, wherein the communication blocks of the train of communication blocks are each of a fixed duration and are comprised of a sequence of multiple frames, wherein network resources for the current communications block are allocated to the plurality of telecommunications devices for the duration of the current communication block.

7. The one or more non-transitory computer-readable storage media of claim 6, wherein at least one telecommunications device of the plurality of telecommunications devices is assigned at least one communication burst such that the at least one telecommunications device sleeps through a preamble of at least one frame of the sequence of multiple frames of the current communications block.

8. The one or more non-transitory computer-readable storage media of claim 6, wherein at least one telecommunications device of the plurality of telecommunications devices is assigned at least one communication burst such that the at least one telecommunications device sleeps through at least a portion of a last frame of the sequence of multiple frames of the current communications block and is awoken prior to a preamble of a next communications block.

9. The one or more non-transitory computer-readable storage media of claim 1, wherein the communication blocks of the train of communication blocks are each of a fixed duration and are comprised of a single frame, wherein at least one telecommunications device of the plurality of telecommunications devices is assigned at least one communication burst such that the at least one telecommunications device enters sleep mode during the current communications block.

10. A method implemented on a telecommunications device by a processor configured to execute instructions that, when executed by the processor, direct the telecommunications device to perform acts comprising:
receiving a network resource allocation message that indicates network resources allocated, during a current communications block, for at least one communication burst;
determining whether to enter a sleep mode during the current communications block based at least in part on the network resource allocation message; and
placing, during the current communications block, the telecommunications device in sleep mode in response to the determination to enter sleep mode.

11. The method of claim 10, wherein the network resource allocation message includes a power-mode indicator that is indicative of whether the telecommunications device should enter sleep mode during the current communications block.

12. The method of claim 11, wherein the power-mode indicator indicates when the telecommunications device should enter sleep mode.

13. The method of claim 11, wherein the power-mode indicator indicates either a wake-time or a duration for the power sleep mode.

14. The method of claim 10, wherein the current communication block is one of a train of communication blocks that are each of a fixed duration and are comprised of a sequence of multiple frames, wherein network resources for the current communications block is allocated to the telecommunications device for the duration of the current communication block.

15. The method of claim 14, wherein the telecommunications device is assigned at least one communication burst such that the telecommunications device sleeps through a preamble of at least one frame of the sequence of multiple frames of the current communications block.

16. The method of claim 14, wherein the telecommunications device is assigned at least one communication burst such that the telecommunications device sleeps through at least a portion of a last frame of the sequence of multiple frames of the current communications block and is awoken prior to a preamble of a next communications block.

17. A communications system that provides communication blocks for carrying packetized communications between a base station and a telecommunications device, the communications system comprising:
a base station having an antenna that transmits radio frequency signal encoded with packetized information to, and receives radio frequency signal encoded with packetized information from, a plurality of telecommunications devices; and
a network resource scheduler that schedules, for the plurality of telecommunications devices, network resource allocations for a current communications block based at least in part on power management of the plurality of telecommunications devices by performing acts comprising:
for the current communications block and for each telecommunications device of the plurality of telecommunications devices,
determining whether a respective telecommunications device may save energy by entering sleep mode during a time interval in which network resources are not allocated to the respective telecommunications device, the time interval being at least one of: (a) before an earliest candidate communication burst commences; (b) after a last candidate communication burst ends; and (c) between an end of a first candidate communication burst and a beginning of a second candidate communication burst, where the second communication burst is immediately subsequent to the first communication burst; and
assigning at least one candidate communication burst to the respective telecommunications device in response to determining that the telecommunications device may save energy during the time interval by entering sleep mode.

18. The communications system of claim 17, wherein the determining whether a respective telecommunications device may save energy during the time interval:
calculating the time interval based at least in part on the at least one candidate communication burst; and
determining whether the calculated time interval exceeds a threshold value.

19. The communications system of claim 17, further comprising:
providing each telecommunications devices of the plurality of telecommunications devices with a corresponding power-mode indicator that is indicative of whether the telecommunications device should enter sleep mode during the current communications block.

20. The communications system of claim 17, further comprising:
prioritizing assignments of network resources to the plurality telecommunications devices based at least in part on a corresponding number of connections for each telecommunications device, wherein telecommunications devices with a low number of connections are assigned higher priority before telecommunications devices having a high number of connections; and
assigning the network resource to the plurality of telecommunications devices based at least in part on the prioritization.

* * * * *